June 20, 1950  G. W. VINAL  2,511,887

BATTERY SEPARATOR

Filed May 25, 1945

Inventor
GEORGE WOOD VINAL
By Ralph L Chappell
Attorney

Patented June 20, 1950

2,511,887

UNITED STATES PATENT OFFICE 2,511,887

BATTERY SEPARATOR

George W. Vinal, Washington, D. C.

Application May 25, 1945, Serial No. 595,864

2 Claims. (Cl. 136—145)

(Granted under the act of March 3, 1883, as amended April 30, 1928; 370 O. G. 757)

This invention is concerned with electrolytic diaphragms, more particularly with separators used in secondary cells.

Diaphragms, usually called separators in the battery art, are placed between alternating positive and negative electrodes of electrical cells. Primarily, the necessity for these separators is to prevent adjacent electrodes from coming into contact with each other, thus creating an internal short circuit which is ruinous to cell operation.

A second reason for the use of separators is to prevent the growth of "trees" which can reach from electrode to electrode and create an effective current bridge. Still another reason is to support and retain active material of the plates in its proper and useful place.

Further, separators space the electrodes and thereby provide an adequate amount of electrolyte volume between plates.

Batteries charged and dry, ready to provide current merely on addition of electrolyte, are substantially a necessity in many military situations. They should be dry for transportation purposes, and charged so that they may be readied for service with the least manipulating and in the least time possible.

Thus, there is established the demand for a battery separator which will:

(1) Be made of available materials;

(2) Constitute an adequate diaphragm, separator, and spacer between plates of opposite polarity in storage batteries;

(3) Permit adequate electrolytic conduction and prevent metallic conduction;

(4) Be capable of being stored in the dry condition without impairment of quality.

It is, accordingly, an object of my invention to provide such a diaphragm having all the needed properties and qualities.

More specifically, it is an object of my invention to provide novel battery separators which constitute complete and adequate diaphragms and spacers for wet cells, are not liable to spoilage due to dry storage, will stand up under charge and discharge, will give long battery life on shelf and in service, and will be easily made from available materials.

Other objects and advantages of my invention will be in part referred to herein and in part obvious from the following disclosure.

Figure 4:
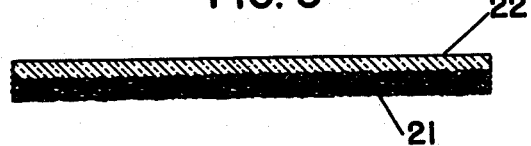

Fig. 4 indicates still a third form of separator in accordance with my invention.

Broadly, my invention resides in the discovery that plastic films naturally permeable or electrolytically conducting or which may be made so may be used advantageously as battery separators in combination with other materials.

Figure 1:
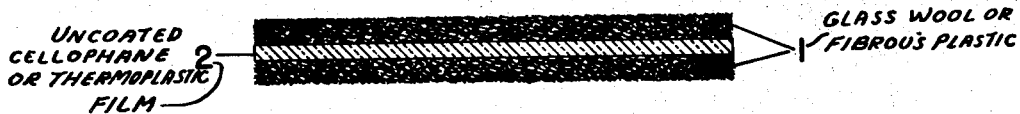
Fig. 1 illustrates a preferred embodiment of my invention, and is a cross section.
Figure 2:
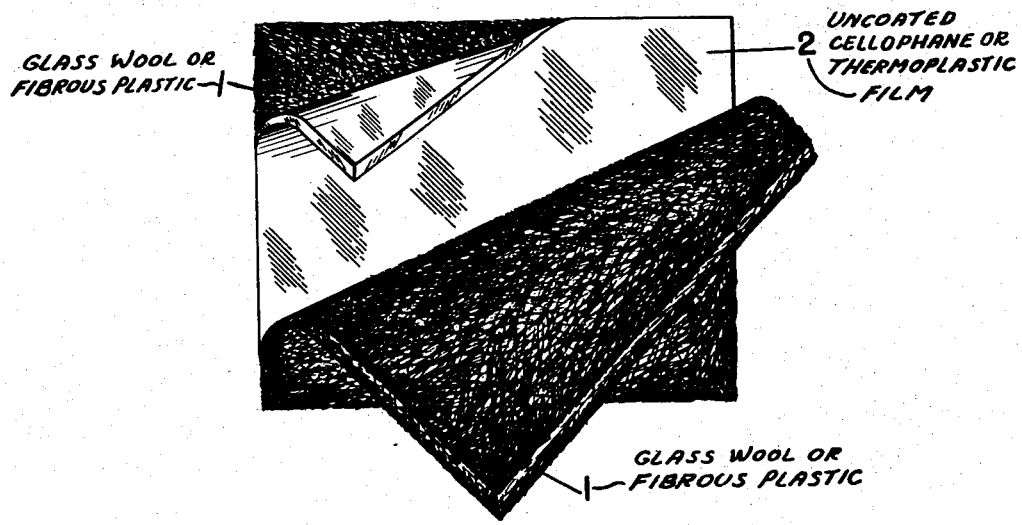
Fig. 2 is a further illustration of the form shown in Fig. 1.

Referring to Figs. 1 and 2, there will be seen a preferred form of my new separator, consisting in this instance of two mats of glass floss 1, between which is placed a plastic film 2.

I have determined the usefulness of films formed from thermoplastic materials, for example, polyvinyl alcohol, polyvinyl acetate, methyl cellulose, carboxymethyl cellulose, polyvinyl butyral, ethyl cellulose, polystyrene, and various forms of nylon. Certain of the materials are not naturally permeable in film form, but may be made so, as by incorporating a soluble salt or a plasticizer subsequently leached out of the film. In order to make porous films of either ethyl cellulose or polystyrene which are not naturally permeable in film form, potassium sulfate or magnesium sulfate is incorporated therein as these salts may be readily leached out of the film. A plasticizer for producing the same result in ethyl cellulose is hydrogenated methyl abietate, known by the trade name of "Hercolyn," which can be removed by an organic solvent.

Glass floss is an eminently suitable material for the fibrous mat. Other fibrous materials of like physical form, such as a fibrous plastic, may be used. Polystyrene floss is an example of fibrous plastic which is compressible into thin sheets when subjected to heat.

Figure 3:
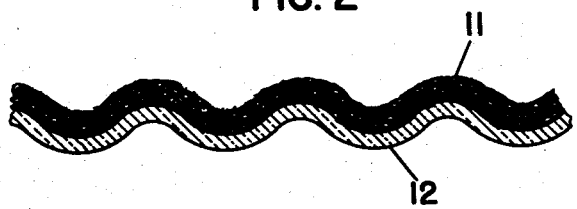
Fig. 3 shows a slightly different separator.

Physically, the permeable film 2 may be used with two fibrous mats 1, as indicated in Figs. 1 and 2. Without attaining all the advantages of that construction, only one mat may be used, this being illustrated in Figs. 3 and 4. Fig. 3 further suggests a corrugated construction which may be employed in any case, while Fig. 4 is intended to indicate a more or less secure bond between the glass mat and the plastic film, which may be advantageous, say for purpose of ease of assembly with the plates when making up the cell. In Fig. 3, 11 refers to the glass mat, 12 to the film. In Fig. 4 the glass mat 21 is bonded to film 22. A suitable bonding agent is formaldehyde or its compounds which will bind with the plastic film when heat and pressure is applied.

The preferred construction shown in Figs. 1 and 2, however, attains all the advantages possible. The two glass floss mats are excellent for retaining the active material on the electrodes, while at the same time their porous structure accommodates large amounts of electrolyte and allows adequate circulation. The mats act as supports for each side of the fragile plastic film, which thereby may be extremely thin. This feature is of value in permitting high drain, though in batteries designed for low drain thicker films are satisfactory. The sheets may be bonded, as suggested in Fig. 4.

The plastic film used must be water permeable and electrolytically but not electronically conductive. The film also must allow the flow of current, and must be little affected by the electrolyte employed. Other materials than those I have named, but having the qualities referred to, will be found useful.

Any of the forms described will be unharmed by dry storage and will consequently be adapted for the manufacture of dry charged batteries. All will prevent treeing.

The invention herein described and claimed may be manufactured and used by or for the Government of the United States of America for governmental purposes without the payment of any royalties thereon or therefor.

I claim:

1. A battery separator comprising at least two members, one being a sheet of fibrous glass floss and a second being a thin film of regenerated cellulose.

2. A battery separator consisting of glass floss mats bonded on each side of a regenerated cellulose film.

GEORGE W. VINAL.

REFERENCES CITED

The following references are of record in the file of this patent:

UNITED STATES PATENTS

| Number | Name | Date |
|---|---|---|
| Re. 22,065 | Young | Apr. 7, 1942 |
| 1,366,223 | Wales | Jan. 18, 1921 |
| 1,574,844 | Oppenheim | Mar. 2, 1926 |
| 2,015,006 | Ekisler | Sept. 17, 1935 |
| 2,117,371 | Slayter | May 17, 1938 |
| 2,133,183 | Baird et al. | Oct. 11, 1938 |
| 2,247,091 | Jumau | June 24, 1941 |
| 2,344,614 | Hulse | Mar. 21, 1944 |
| 2,392,389 | Joyce | Jan. 8, 1946 |
| 2,484,787 | Grant | Oct. 11, 1949 |

FOREIGN PATENTS

| Number | Country | Date |
|---|---|---|
| 154,083 | Great Britain | Nov. 25, 1920 |
| 845,427 | France | May 15, 1939 |

OTHER REFERENCES

Young et al.: J. Ind. & Eng. Chem., vol. 29 (1937), page 1279.

Simrill et al.: J. Ind. & Eng. Chem., vol. 34 (1942), page 226.

Hunter, W. G.: Modern Packaging, June, 1946, page 110.